Feb. 12, 1952 — W. J. PHANEUF — 2,585,832
SURFACE BROACH
Filed July 6, 1949 — 2 SHEETS—SHEET 1
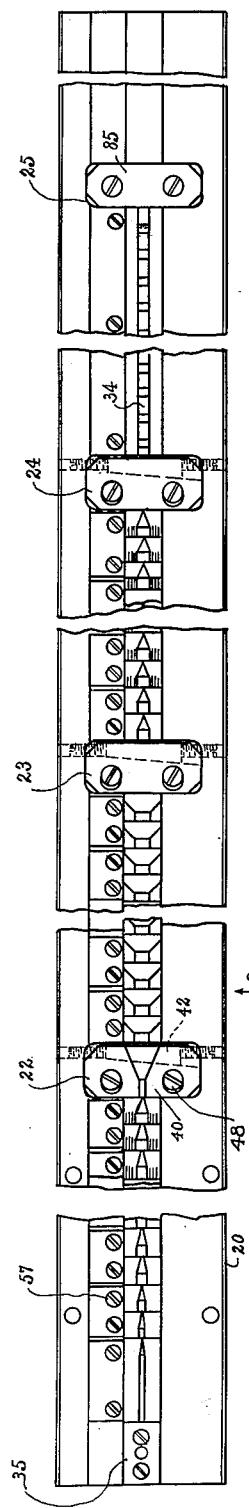
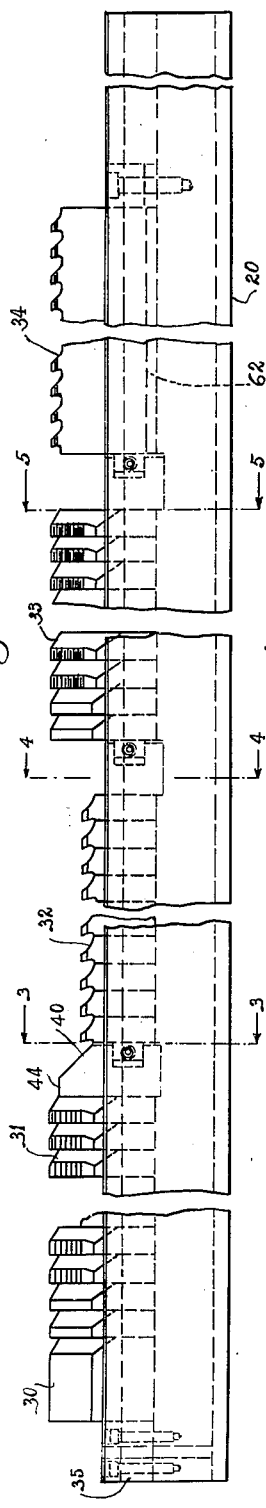
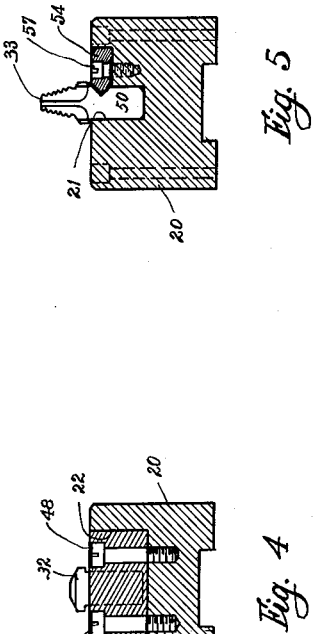
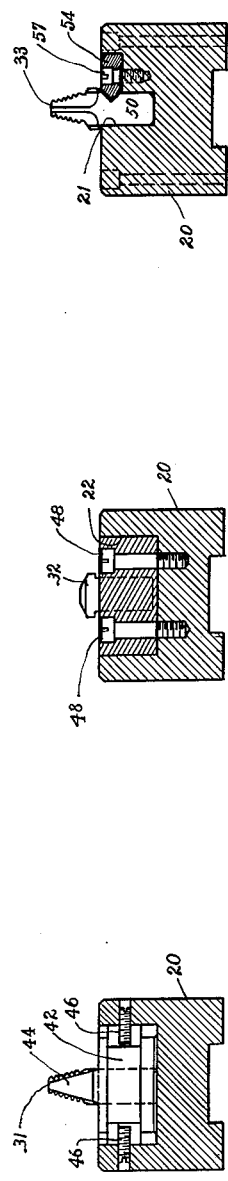
INVENTOR.
WILROSE J. PHANEUF
BY Chas. T. Hawley
ATTY.

Feb. 12, 1952 W. J. PHANEUF 2,585,832
SURFACE BROACH
Filed July 6, 1949 2 SHEETS—SHEET 2

INVENTOR.
WILROSE J. PHANEUF
BY Chas. T. Hawley
ATTY.

Patented Feb. 12, 1952

2,585,832

UNITED STATES PATENT OFFICE 2,585,832

SURFACE BROACH

Wilrose J. Phaneuf, Hudson, Mass., assignor to The Lapointe Machine Tool Company, Hudson, Mass., a corporation of Maine Application July 6, 1949, Serial No. 103,238

5 Claims. (Cl. 29—95.1)

This invention relates to a surface type or external broach having multiple inserted cutters. The broach is preferably formed with both roughing and finishing sections, and is particularly adapted for cutting grooves or channels of specialized cross section. As shown in the drawings, the broach is set up for cutting the so-called "Christmas tree" grooves which receive the butts of the blades in certain commercial turbine rotors.

It is the general object of my invention to provide a broach having improved means for securing multiple inserted cutters in assembled and cooperative relation therein.

A further object is to provide an improved broach cutter so constructed that successive cutters may be repeatedly ground on their cutting faces without changing their assembled relation. I also provide improved means for locking an assembly of cutting units in a broach frame or base.

My invention further relates to arrangements and combinations of parts which will be hereinafter described and more particularly pointed out in the appended claims.

A preferred form of the invention is shown in the drawings, in which

Fig. 1 is a plan view of my improved multiple broach;

Fig. 2 is a side elevation of the broach, looking in the direction of the arrow 2 in Fig. 1;

Figure 6:
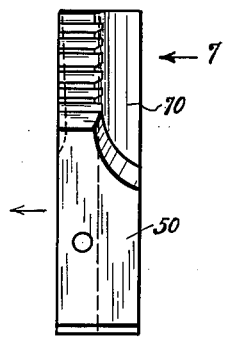
Figure 7:
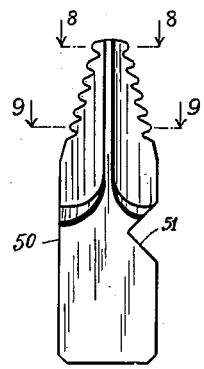
Figure 8:
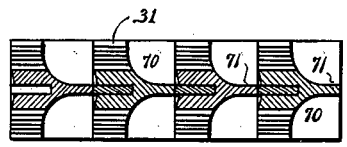
Figure 9:
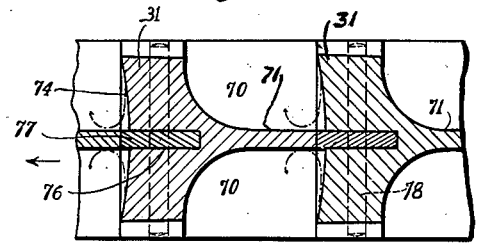
Figure 10:
Figure 11:
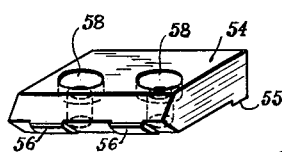
Figure 12:
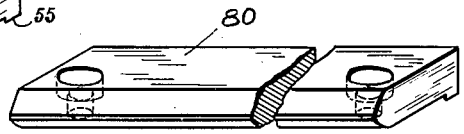
Figures 13, 14:
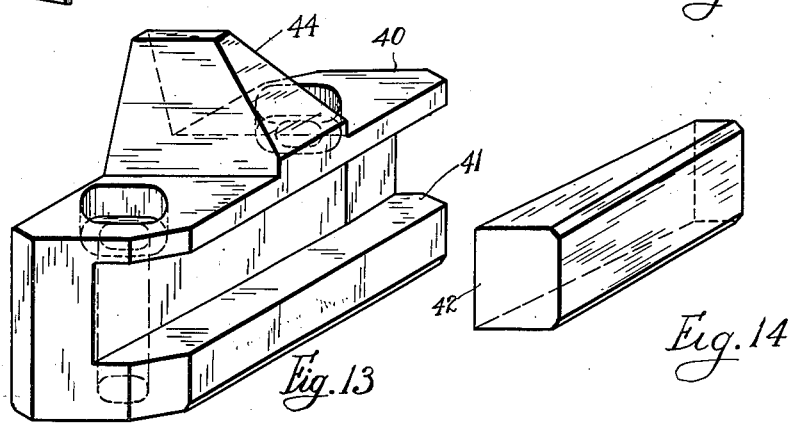
Figure 15:
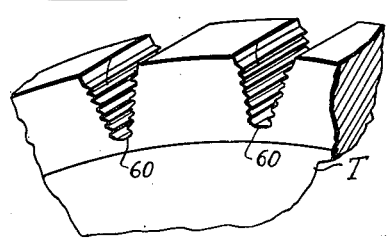
Figure 16:
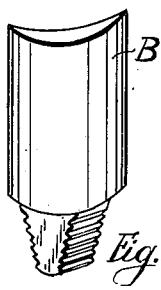

Figs. 3, 4 and 5 are transverse sectional views, taken along the lines 3—3, 4—4 and 5—5 in Fig. 2 respectively;

Fig. 6 is a side elevation of a broaching cutter;

Fig. 7 is a rear view thereof, looking in the direction of the arrow 7 in Fig. 6;

Fig. 8 is a sectional plan view, taken along the line 8—8 in Fig. 7 but showing a plurality of assembled cutters;

Fig. 9 is a similar but enlarged section and taken along the line 9—9 in Fig. 7;

Fig. 10 is a perspective view of a reenforcing strip or bar;

Fig. 11 is a perspective view of a clamping bar;

Fig. 12 is a similar view of another clamping bar;

Fig. 13 is a perspective view of a locking member;

Fig. 14 is a perspective view of a locking wedge;

Fig. 15 is a side elevation of a fragment of a turbine rotor having "Christmas tree" type grooves or channels formed therein; and Fig. 16 is a perspective view of a turbine blade adapted to be seated in a groove or channel of the type shown in Fig. 15.

Referring to Figs. 1 to 5, my improved broach comprises a substantially elongated base or frame 20 having a longitudinal channel 21 extending lengthwise thereof, and having locking recesses 22, 23, 24 and 25 formed in the upper surface thereof.

As shown herein, my improved broach comprises a pilot member 30, a plurality of roughing cutters 31, a plurality of chamfering cutters 32, a plurality of finishing cutters 33, and a topping bar or cutter 34.

A block or abutment 35 is permanently secured in the leading or left-hand end of the broach frame or base 20 as viewed in Figs. 1 and 2.

The pilot member 30 and a plurality of roughing cutters 31 are inserted in the channel 21 between the block or abutment 35 and a locking member 40 seated in the locking recess 22.

The locking member 40 is preferably formed as shown in Fig. 13 and is provided with a tapered groove or recess 41 on its back side which is adapted to receive a correspondingly tapered wedge 42 (Fig. 14). The member 40 also has an upward projection 44 which engages and reenforces the upper parts of the cutting units 31.

Screws 46 (Fig. 3) are threaded in the side flanges of the base 20 and may be turned to shift the wedge 42 along the recess 41 in the block 40, thus applying pressure to the assembled cutting units 31 and pilot member 30 and against the abutment 35. Screws 48 extending through elongated openings in the block 40 may then be tightened to hold the block 40 in adjusted position as indicated in Fig. 4.

The pilot member 30 and each of the cutting units 31, 32 and 33 has a shank 50 (Figs. 6 and 7) adapted to fit in the longitudinal groove or channel 21 in the base 20, as shown in Fig. 5, and each shank 50 has a notch 51 in one side thereof, adapted to receive the beveled edge of a clamping bar 54 (Fig. 11).

Each bar 54 has a lower supporting flange 55 along its outer edge and has convex lugs or projecting portions 56 on its beveled front edge. Screws 57 (Figs. 1 and 5) extend through openings 58 (Fig. 11) in the clamping bar 54. By tightening the screws 57, each pair of cutting units may be firmly secured in the base 20 after being longitudinally positioned by the locking members 40 and wedges 42. The provision of the bottom flange 55 and convex surfaces 56 allows each clamping bar to be rocked slightly in tightening the same against the shanks 50.

In the production of turbine rotors, it is more or less common practice to index the rotor and to provide transverse slots or recesses therein by a sawing or milling operation and in advance of the broaching operation. The pilot 30 then enters these notches successively and each notch is broached to the desired finished size and cross section, it being understood that the cutters in each group are gradually increased in size toward the right in Figs. 1 and 2.

The flanging cutters 32 are provided for finishing the outer portion of each recess R (Fig. 15) as it is broached in the edge or rim portion of the rotor T. The finishing cutters 33 then complete the broaching of the recess R, and the topping cutter 34 finishes the inner end portion 60 (Fig. 15) of each recess R.

The topping cutter or bar 34 is preferably of such height that it does not reach to the bottom of the recess 21 but is supported on a shim 62 which may be selected to bring the operative edge of the topping bar to any desired position.

The general cross section of the cutters 31 is shown in Figs. 8 and 9 and the cross section of the finishing cutters 33 is similar.

It will be noted that each cutter 31 or 33 is substantially recessed in its rear portion as indicated at 70 to provide chip clearance but has a narrow supporting web 71 between the recesses 70. The cutting face of each cutter 31 or 33 is also preferably given a concave surface as indicated at 74 (Fig. 9) to facilitate the cutting operation and also to more effectively guide the chips into the recesses 70.

In order that the successive cutters may effectively reenforce each other, each cutter 31 or 33 is vertically grooved in its cutting face as indicated at 76 (Fig. 9), and a reinforcing bar or strip 77 (Fig. 10) is inserted in each recess 76. Each bar 77 is positioned to engage the back edge of one of the webs 71 previously described, so that each cutter will be firmly seated against the next adjacent cutter.

The bars 77 may be frictionally held in the grooves or recesses 76, or cross-pins 78 may be inserted through holes 79 in the bars.

When it is necessary to grind the cutting face of a cutter, the bar 76 is removed during the grinding operation and is afterwards replaced, so that the thickness of the cutting portions of the cutting units 31 or 33 may be substantially reduced but without effecting the assembled relation of the cutting units.

The long clamping bar 80 shown in Fig. 12 may be used for securing the elongated topping cutter 34, while the shorter clamping bars 54 are preferably used for securing each pair of cutters 31, 32 or 33. Turbine blades of the type shown at B in Fig. 16 are adapted to be firmly seated in the recesses R shown in Fig. 15.

Locking members 40 and locking wedges 42 are used in the locking recesses 23 and 24 as well as in the recess 22, but a plain rectangular block or abutment 25 (Fig. 1) may be used in the recess 25.

It will be understood that the selection and arrangement of cutters herein shown is illustrative only and that the form and grouping of the cutters will be varied in accordance with the cross section of the groove or recess to be produced.

Having thus described my invention and the advantages thereof, I do not wish to be limited to the details herein disclosed, otherwise than as set forth in the claims, but what I claim is:

1. A sectional broach comprising a longitudinally extended body having a longitudinal channel therein, a plurality of cutting members mounted in and projecting above said body and having side notches therein with converging upper and lower faces, clamping bars mounted on said body and having beveled inner edge portions engaging said cutting members in said notches to firmly seat said members, fixed supporting means for the outer edge portions of said clamping bars, said clamping bars being angularly movable about their outer edge portions to holding position, and securing means effective to force said clamping bars downward and to thereby secure said cutting members in said body.

2. The combination in a sectional broach as set forth in claim 1, in which the beveled edge portions of said clamping bars have convex lower bearing surfaces to engage the lower faces of the side notches of said cutting members.

3. A sectional broach comprising a body having a longitudinal channel, a plurality of adjacent cutting members mounted therein and each having its front cutting face substantially perpendicular to the bottom of said channel and having a longitudinal and central groove therein, and a spacing bar for each cutting member mounted in the central groove of its cutting face and positioned to engage the rear face of the next adjacent cutting member to determine the spacing of said cutting members in said longitudinal channel and to reenforce said adjacent cutting member.

4. A sectional broach comprising a body having a longitudinal channel, a plurality of adjacent cutting members mounted therein and each having its front cutting face substantially perpendicular to the bottom of said channel and having a longitudinal and central groove therein, and each cutting member being relieved on its rear face at each side but retaining a middle web of full thickness, and a spacing bar for each cutting member mounted in the central groove of its cutting face and positioned to engage the rear edge face of the middle web of the next adjacent cutting member to determine the spacing of said cutting members in said longitudinal channel and to reenforce said adjacent cutting member.

5. A sectional broach comprising a body having a longitudinal channel and a plurality of adjacent cutting members mounted therein, each cutting member being relieved in its rear portion but retaining a middle web of full thickness, the front cutting face of each cutting member being concave in horizontal section, each cutting member having a transverse, central groove in its front cutting face, and a spacing bar mounted in said groove in said cutting member and aligned with the middle web of the next adjacent cutting member and positioned to engage said web at its rear face.

WILROSE J. PHANEUF.

REFERENCES CITED

The following references are of record in the file of this patent:

UNITED STATES PATENTS

| Number | Name | Date |
| --- | --- | --- |
| 280,866 | Ryan | July 10, 1883 |
| 1,272,841 | Oakley | July 16, 1918 |
| 1,440,933 | Perkins et al. | Jan. 2, 1923 |